United States Patent
Gurumoorthi et al.

(10) Patent No.: US 10,179,655 B2
(45) Date of Patent: Jan. 15, 2019

(54) SYSTEM FOR DETECTING THE PRESENCE OF EMISSION VAPORS FOR AIRCRAFT USING A COMPOSITE VISUAL IMAGE

(71) Applicant: HONEYWELL INTERNATIONAL INC., Morris Plains, NJ (US)

(72) Inventors: Jeevish Glastine Gurumoorthi, Bangalore (IN); Mohammed Ibrahim Mohideen, Bangalore (IN); Prabhudev Bhuyar, Bangalore (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 58 days.

(21) Appl. No.: 15/582,216

(22) Filed: Apr. 28, 2017

(65) Prior Publication Data
US 2018/0312273 A1 Nov. 1, 2018

(51) Int. Cl.
| B64D 45/00 | (2006.01) |
| B64D 47/08 | (2006.01) |
| G08G 5/00 | (2006.01) |
| G06T 19/00 | (2011.01) |
| G06T 7/20 | (2017.01) |

(52) U.S. Cl.
CPC ............ *B64D 45/00* (2013.01); *B64D 47/08* (2013.01); *G06T 7/20* (2013.01); *G06T 19/006* (2013.01); *G08G 5/0086* (2013.01); *G06T 2207/10016* (2013.01); *G06T 2207/10024* (2013.01); *G06T 2207/10032* (2013.01); *G06T 2207/10048* (2013.01); *G06T 2207/20221* (2013.01); *G06T 2207/30241* (2013.01); *G06T 2207/30261* (2013.01)

(58) Field of Classification Search
CPC .......... B64D 45/00; B64D 47/08; G06T 7/20; G06T 19/006; G06T 2207/10016; G06T 2207/10032; G06T 2207/10024; G06T 2207/30261; G06T 2207/20221; G06T 2207/30241; G06T 2207/10048; G08G 5/0086
See application file for complete search history.

(56) References Cited

U.S. PATENT DOCUMENTS

| 4,555,627 A | 11/1985 | McRae, Jr. |
| 5,166,789 A | 11/1992 | Myrick |

(Continued)

OTHER PUBLICATIONS

"Thermal Imagine Cameras for Flare Monitoring", www.flir.com.
Extended EP Search Report for Application No. 18169134.6 dated Aug. 20, 2018.

*Primary Examiner* — Rodney A Butler
(74) *Attorney, Agent, or Firm* — Lorenz & Kopf, LLP

(57) ABSTRACT

A system is provided for generating an alert to the presence of emission vapors for a low altitude in-flight aircraft. An obstacle database and a terrain database provide parameters for obstacles and terrain features to a synthetic vision processor. The processor creates a graphic overlay of the terrain and obstacles that is combined with thermal images of emission vapors by a combined vision processor to create a combined synthetic image. An emissions threat calculator analyzes the synthetic image for the presence of emission vapors. If any emission vapors are detected in proximity to the aircraft, an alert and suggested maneuvers to avoid the emission vapors are sent to the aircraft.

20 Claims, 4 Drawing Sheets

(56) References Cited

U.S. PATENT DOCUMENTS

| | | | |
|---|---|---|---|
| 5,210,586 A * | 5/1993 | Grage | G01S 17/87 |
| | | | 348/145 |
| 5,276,326 A * | 1/1994 | Philpott | G01S 17/95 |
| | | | 250/334 |
| 5,602,543 A | 2/1997 | Prata et al. | |
| 6,690,472 B2 | 2/2004 | Kulp et al. | |
| 6,995,846 B2 * | 2/2006 | Kalayeh | G01N 21/31 |
| | | | 250/338.5 |
| 2006/0009887 A1 * | 1/2006 | Rubin | G01C 23/00 |
| | | | 701/9 |
| 2012/0068862 A1 | 3/2012 | Tillotson | |
| 2013/0087708 A1 | 4/2013 | Tillotson | |
| 2013/0135470 A1 | 5/2013 | Prata et al. | |
| 2014/0267422 A1 | 9/2014 | Feyereisen et al. | |
| 2016/0133138 A1 | 5/2016 | Oldach et al. | |
| 2016/0252351 A1 | 9/2016 | Feldmann et al. | |

* cited by examiner

SYSTEM FOR DETECTING THE PRESENCE OF EMISSION VAPORS FOR AIRCRAFT USING A COMPOSITE VISUAL IMAGE

The present invention generally relates to a system for an aircraft to detect emission vapors, and more particularly to a system for detecting the presence of emission vapors that can affect aircraft operations, using a composite visual image.

BACKGROUND

Helicopters are commonly used to service offshore oil rigs. The helicopters are used to ferry supplies and personnel both to and from these facilities. Industrial facilities may vent emission vapors and gases during normal operations. Many petrochemical facilities such as offshore oil rigs, oil and gas drilling sites and petrochemical facilities will vent excess and byproduct gases or vapors to a "flare" system. The flare may or may not burn the excess gases. In either event, the gases or vapors could potentially be a hazard to an aircraft.

Accordingly, it is desirable to provide a system for detecting the presence of emission vapors that may affect an aircraft's operation.

BRIEF SUMMARY

In one embodiment, a system is disclosed for generating an alert to the presence of emission vapors for a low altitude in-flight aircraft, comprising: an obstacle database containing parameters of obstacles in proximity to the aircraft; a terrain database containing parameters of terrain in proximity to the aircraft; a synthetic vision processor that creates a graphic overlay of the terrain and the obstacles based on the parameters in the obstacle database and the terrain database; an imaging camera that creates a thermal image of emission vapors detected in proximity to the aircraft; a combined vision processor that combines the graphic overlay with the thermal image of the emission vapors to create a combined synthetic image; an emissions threat calculator which analyzes for the presence of emission vapors in proximity to the aircraft based on the combined synthetic image, current environmental conditions in proximity to the aircraft, and characteristics of the emission vapors; an alert system that alerts the aircraft to the presence of emission vapors detected by the emissions threat calculator; and an advisory system that cues the pilot of the aircraft with suggested maneuvers to avoid the emission vapors.

In another embodiment, a method is disclosed for generating an alert to the presence of emission vapors for a low altitude in-flight aircraft, comprising: retrieving obstacle parameters for obstacles in proximity to the aircraft from an obstacle database; creating a graphic overlay based on the obstacle parameters using a synthetic vision processor; retrieving images of emission vapors in proximity to the aircraft from an imaging camera; combining the graphic overlay with the images of emission vapors to create a synthetic image with a combined vision processor; analyzing the synthetic image for the presence of emission vapors in proximity to the aircraft with an exhaust threat calculator; generating an alert for the aircraft if emission vapors are detected within a threat zone to the aircraft created by the exhaust threat calculator; and suggesting avoidance maneuvers for the aircraft to avoid the threat zone to the aircraft.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
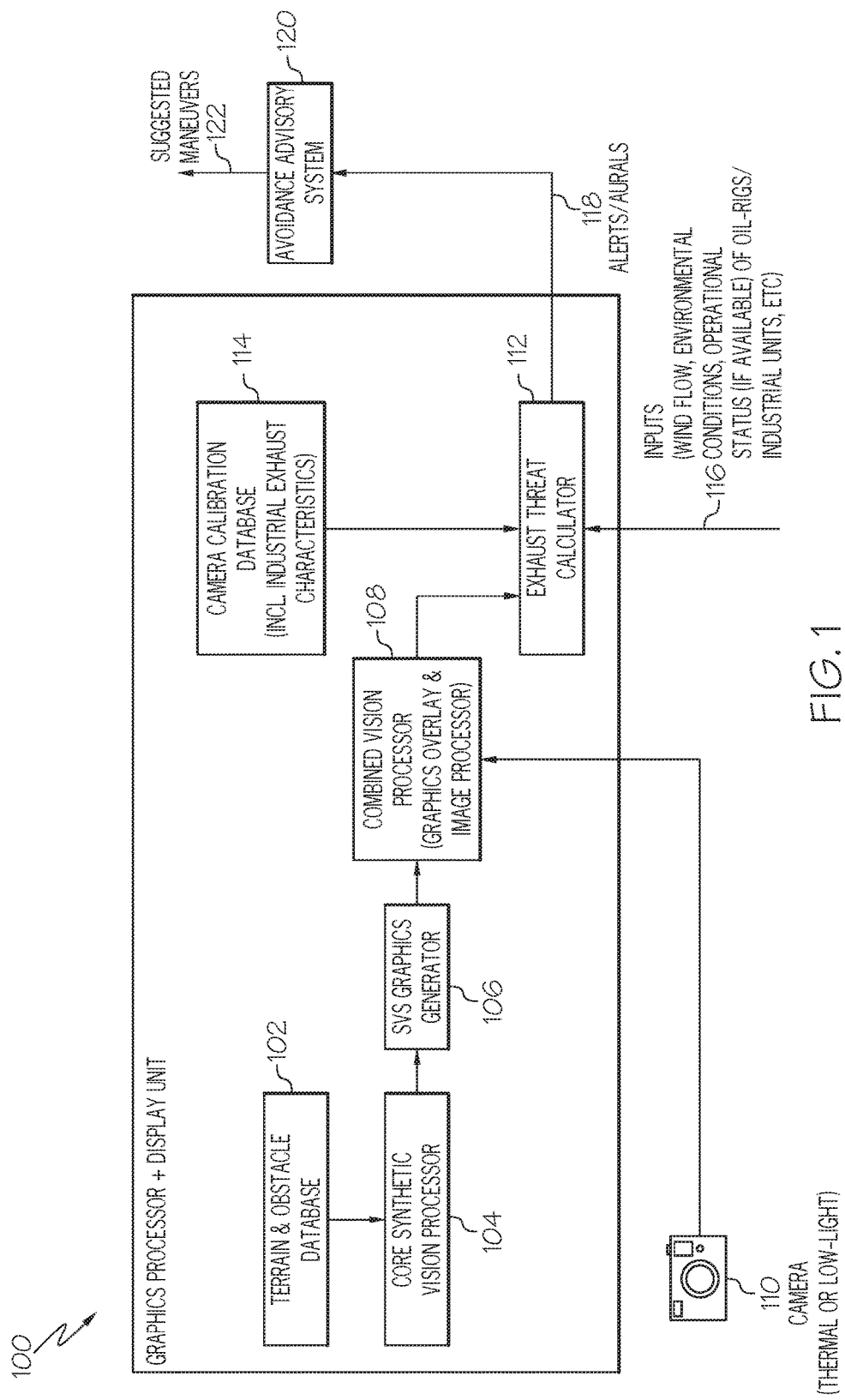
FIG. 1 is a block diagram showing system components that create a composite visual image of emission vapors in proximity to an aircraft in accordance with an exemplary embodiment.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor module (shared, dedicated, or group) and memory module that executes one or more software or firmware programs, a combinational logic circuit, and/or other suitable components that provide the described functionality.

A system for generating an alert to the presence of emission vapors for low-flying aircraft has been developed. With reference to FIG. 1, a block diagram is shown for a system 100 on board the aircraft that creates a composite visual image of emission vapors in proximity to an aircraft in accordance with some embodiments. The system 100 includes a terrain database and an obstacle database 102 that provide parameters for obstacles and terrain features in proximity to the aircraft. For example, obstacles may include flares, gas vents, chimneys and other emission sources. The databases may be separate with one database for terrain and a separate database for obstacles. In other embodiments, the databases may be combined into a single entity. Additionally, the databases may be located on board the aircraft along with the rest of the system. Alternatively, the databases may be remotely located on the ground and provide the parameters to the system on board the aircraft via a communications link. The terrain and obstacle parameters are provided to a core synthetic vision processor 104. The synthetic vision processor uses a synthetic vision system (SVS) generator 106 to create a graphic overlay of the terrain and obstacles based on the parameters.

An imaging camera 110 on board the aircraft creates an image of emission vapors that are vented from such facilities as offshore oil platforms, oil drilling rigs, petrochemical processing plants, etc. The emission vapors are typically byproduct gases from these facilities. The most common gases, such as methane, are typically invisible and may only be detected by temperature data recorded by a camera. For example, an infrared (IR) camera may be used to capture a thermal image of a facility to reveal the presence of emission vapors. One example of such an IR camera is a forward-looking infrared (FLIR) system. In other embodiments, the imaging camera may be a lowlight amplification device commonly referred to as a "night vision" camera. In still other embodiments, both an IR camera and a lowlight camera may be used in conjunction with each other. It should be understood that the imaging camera can create an image of various types of industrial exhausts, flares, plumes and smoke in various visibility conditions.

Figure 2A:
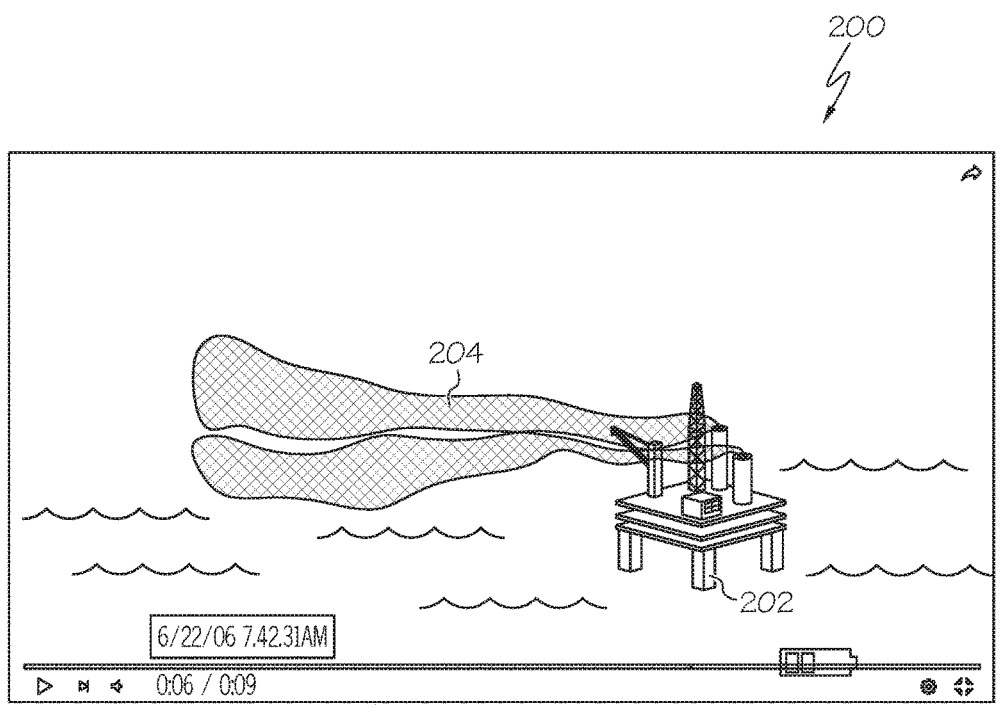
FIG. 2a is a thermal image of a plume of emission vapors from an offshore oil platform taken from a forward-looking infrared (FLIR) system in accordance with another exemplary embodiment.

A combined vision processor 108 receives both the graphic overlay image and the emission vapors images. It combines the two by overlaying the emission vapor thermal signature image on the graphic image to create a combined "synthetic image". The synthetic image is a combination of the graphic overlay that shows the location of terrain and obstacles as well as the location of any vented gases that may be undesirably ingested into the aircraft's engines. In some embodiments, the combined vision processor may add colors to the image of the gases in order to provide greater contrast to the synthetic image. As such, the synthetic image enables a threat assessment of the presence of emission vapors to the aircraft. FIG. 2a shows an example of a thermal image 200 taken from a FLIR system that shows of an offshore oil platform 202 with a plume of emission vapors 204.

Returning now to FIG. 1, an exhaust threat calculator 112 receives the synthetic image for threat analysis to the aircraft. The calculator receives additional inputs 116 including: wind speed and direction; environmental conditions; operational status of the ground facility; etc. The calculator also receives industrial exhausts characteristics from a camera calibration database 114. For example, various industrial gases have different temperature signatures that can impact the nature of the image of the emission vapors. Once all the data, characteristics and images are collected, the emissions threat calculator creates a threat zone for the aircraft based on the intensity and flow direction of the emission vapors. The threat zone is based on the aircraft's present flight trajectory and other flight parameters. If the emission vapors are present and are postulated to be a threat to the aircraft, the exhaust threat calculator generates an alert for the aircraft crew 118. The alert may be an audio warning, a visual warning or both. Additionally, an avoidance advisory system 120 may generate cues for the pilot of the aircraft with suggested maneuvers 122 to avoid the emission vapors in some embodiments. The suggested maneuvers may be an audio message, a visual message or both.

Figure 2B:
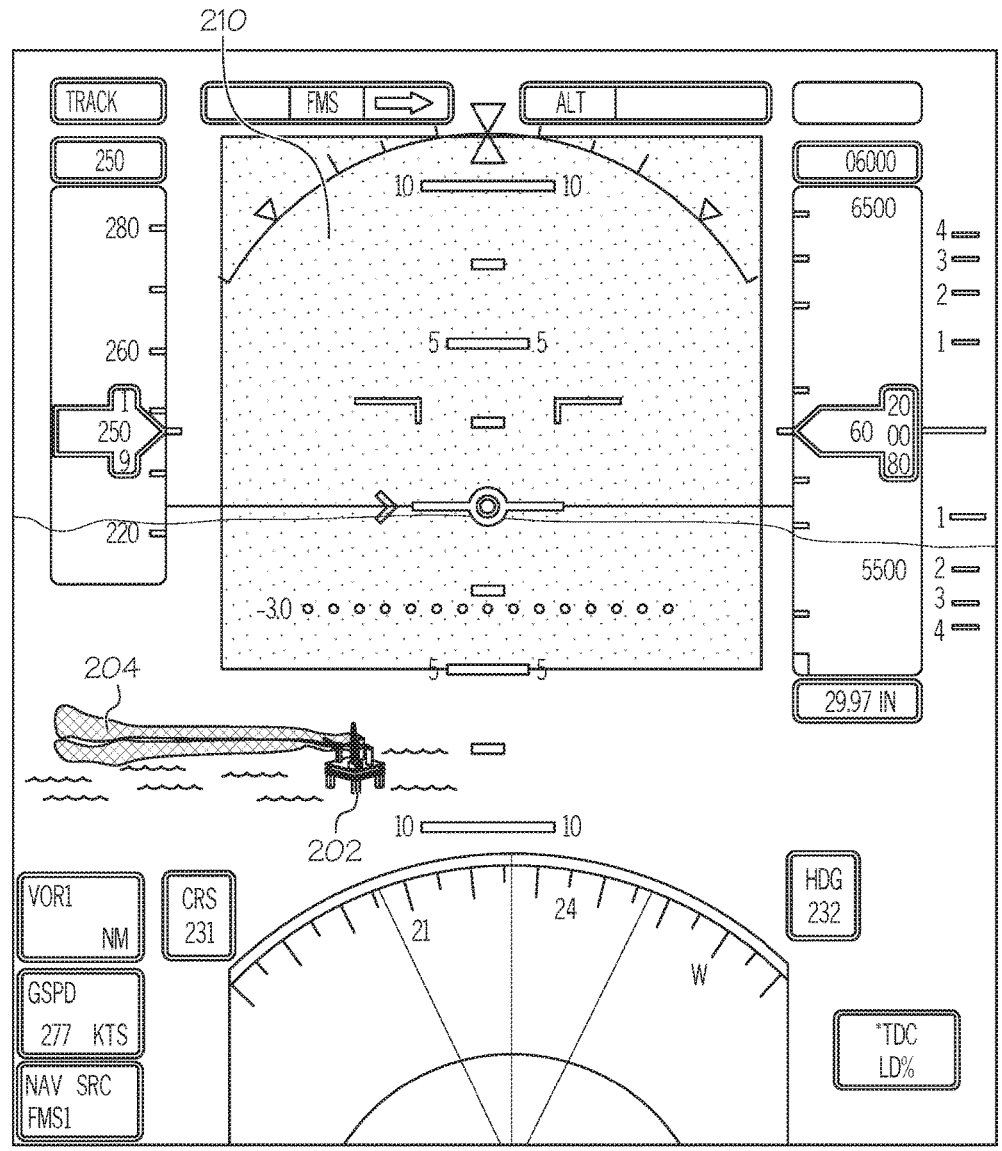
FIG. 2b is a combined synthetic image (CVS) will an overlay of the thermal image of a plume of emission vapors from an offshore oil platform shown in FIG. 2b in accordance with another exemplary embodiment.
Figure 3:
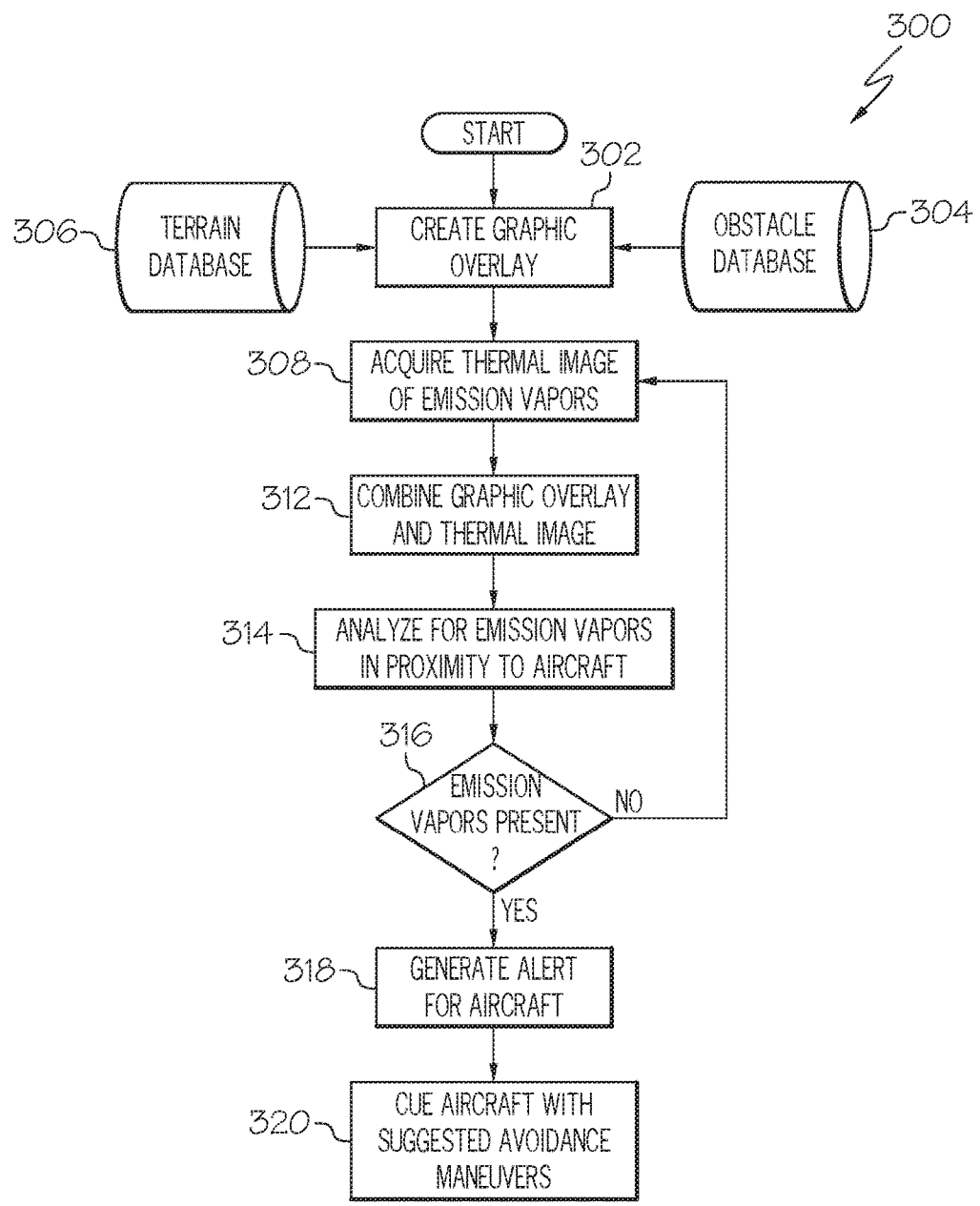
FIG. 3 is a flowchart showing a method for creating a composite visual image of emission vapors in proximity to an aircraft in accordance with another exemplary embodiment.

In other embodiments, the system may include a combined vision system (CVS) that displays the combined synthetic image for the aircraft crew. The CVS typically is displayed in the primary flight display (PFD) format, which provides a perspective view of the outside environment from the cockpit. However, the emission threat information may be represented on a wide variety of display formats including a primary flight display (PFD), a lateral map and/or a vertical situational display (VSD) which provides various views of the outside of the aircraft. The CVS may utilize a three (3D) dimensional display to add depth perception for the crew. In other embodiments, the CVS may utilize a heads-up display (HUD). FIG. 2b shows an example of a CVS image that is a flight display 210 with an overlay of the thermal image 200 shown previously in FIG. 2a. The combined synthetic image shows the thermal image of the offshore oil platform 202 and the emissions vapor plume 204 overlaid on the flight display.

With continued reference to FIGS. 1, 2a and 2b, FIG. 3 shows a flowchart of a method for creating a composite visual image of emission vapors in proximity to an aircraft in accordance with another exemplary embodiment. In this embodiment, a graphic overlay is created 302 with parameter data from the terrain database 306 and the obstacle database 304. A thermal signature of emission vapors 308 is reflected in the image data acquired from a camera imaging system. Both the graphic overlay and the thermal image are combined 312 into a synthetic image. The synthetic image is analyzed for emission vapors in proximity to the aircraft 314. If no emission vapors are present 316 this embodiment will continue to monitor the thermal images for new emission vapors. However, if emission vapors are detected, and alert is generated for the aircraft 318 and cues are provided with suggested avoidance maneuvers 320. In other embodiments, the suggested avoidance maneuvers may be input directly into an auto-pilot system for automated threat avoidance.

As an illustrative example of one embodiment, the method may apply to a helicopter on approach to an offshore oil platform. As the helicopter begins its approach, the onboard system retrieves the parameters and dimensions of the oil platform from the onboard obstacle database with the synthetic vision processor. The processor uses an SVS graphics generator to create a graphic overlay of the dimensions of the oil platform. Simultaneously, a FLIR camera takes a thermal image of any methane gas being vented by the platform. The combined vision processor combines the graphic overlay with the thermal image while highlighting the methane gas in a contrasting color. The combined graphic overlay and thermal image form a synthetic image which is displayed on an CVS for the helicopter pilot. The CVS displays the synthetic image as part of a HUD on the front windscreen of the helicopter.

Meanwhile, the exhaust threat calculator receives the wind speed, wind direction and status of the oil platform's flare. The system also retrieves the thermal characteristics of methane gas from the onboard camera database. The presence of methane gas is identified from the image along with its density and flow direction. The enhanced threat calculator creates a threat zone for the helicopter. Based on the helicopter's current flight path, the helicopter will enter the threat zone. The system provides an audio warning to the pilot along with a visual warning on the HUD. The system also provides instructions to the pilot to pull up and circle the oil platform at a designated altitude that maintains a safety margin outside of the threat zone until the methane gas cloud dissipates.

One skilled in the art will appreciate that the depiction of the system and the various components are merely exemplary and are not limiting with respect to size of the components or location within the system. Thus, the present disclosure is not limited to any specific layout and the system may include additional electronic components not shown in its implementation.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A system for generating an alert to the presence of emission vapors for a low altitude in-flight aircraft, comprising:
　an obstacle database containing parameters of obstacles in proximity to the aircraft;
　a terrain database containing parameters of terrain in proximity to the aircraft;
　a synthetic vision processor in operable communication with the obstacle database and the terrain database, the synthetic vision processor configured to create a graphic overlay of the terrain and the obstacles based on the parameters in the obstacle database and the terrain database;
　an imaging camera configured to create a thermal image of emission vapors detected in proximity to the aircraft;
　a combined vision processor in operable communication with the synthetic vision processor and the imaging camera, the combined vision processor configured to combine the graphic overlay with the thermal image of the emission vapors to create a combined synthetic image;
　an emissions threat calculator in operable communication with the combined vision processor and configured to analyze for the presence of emission vapors in proximity to the aircraft based on the combined synthetic image, current environmental conditions in proximity to the aircraft, and characteristics of the emission vapors;

an alert system in operable communication with the emissions threat calculator and configured to alert the aircraft to the presence of emission vapors detected by the emissions threat calculator; and an advisory system in operable communication with the emissions threat calculator and configured to generate cues the pilot of the aircraft with suggested maneuvers to avoid the emission vapors.

2. The system of claim 1, further comprising:
an enhanced vision system configured to display the combined synthetic image for the aircraft crew.

3. The system of claim 2, where the enhanced vision system provides a three dimensional (3D) display.

4. The system of claim 2, where the enhanced vision system provides a heads-up display (HUD).

5. The system of claim 1, where the imaging camera creates a lowlight image of emission vapors detected in proximity to the aircraft.

6. The system of claim 1, where the combined vision processor adds color to the thermal image of the emission vapors to improve visual contrast of the synthetic image.

7. The system of claim 1, where the emissions threat calculator analyzes the emission vapors for intensity and flow direction.

8. The system of claim 7, where the emissions threat calculator creates a threat zone for the aircraft.

9. The system of claim 8, where the threat zone is based on the aircraft's present flight trajectory.

10. A method for generating an alert to the presence of emission vapors for a low altitude in-flight aircraft, comprising:
retrieving obstacle parameters for obstacles in proximity to the aircraft from an obstacle database;
creating a graphic overlay based on the obstacle parameters using a synthetic vision processor;
retrieving images of emission vapors in proximity to the aircraft from an imaging camera;
combining the graphic overlay with the images of emission vapors to create a synthetic image with a combined vision processor;
analyzing the synthetic image for the presence of emission vapors in proximity to the aircraft with an exhaust threat calculator;
generating an alert for the aircraft if emission vapors are detected within a threat zone to the aircraft created by the exhaust threat calculator; and
suggesting avoidance maneuvers for the aircraft to avoid the threat zone to the aircraft.

11. The method of claim 10, further comprising:
retrieving terrain parameters for terrain in proximity to the aircraft from a terrain database; and
combining the terrain parameters with the obstacle parameters to create a graphic overlay using the synthetic vision processor.

12. The method of claim 10, where the imaging camera is an infrared (IR) thermal imaging camera.

13. The method of claim 10, where the imaging camera is a lowlight imaging camera.

14. The method of claim 10, where the images of emission vapors are colorized to improve image contrast.

15. The method of claim 10, where the exhaust threat calculator analyzes the intensity and flow direction of emission vapors to create the threat zone to the aircraft.

16. The method of claim 10, where the alert for the aircraft is an audio signal.

17. The method of claim 10, where the alert for the aircraft is a visual display.

18. The method of claim 10, where the avoidance maneuver is suggested with an audio signal.

19. The method of claim 10, where the avoidance maneuver is suggested with a visual display.

20. The method of claim 10, where the suggested avoidance maneuver is input into an auto-pilot system for the aircraft that automatically implements the suggested avoidance maneuver.

* * * * *